United States Patent [19]

Fujimori et al.

[11] Patent Number: 4,848,142
[45] Date of Patent: Jul. 18, 1989

[54] MOTOR VEHICLE PERFORMANCE TEST APPARATUS

[75] Inventors: Toshio Fujimori; Takeyuki Honda, both of Tokyo; Yoji Inagaki, Yokohama; Fumio Yoshida, Chiba; Seiichi Akizuki, Tokyo, all of Japan

[73] Assignee: Nissan Motor Sales Co., Ltd., Tokyo, Japan

[21] Appl. No.: 256,754

[22] Filed: Oct. 12, 1988

[30] Foreign Application Priority Data

Oct. 15, 1987 [JP] Japan .................. 62-258432
Mar. 30, 1988 [JP] Japan .................. 63-74479

[51] Int. Cl.⁴ .......................... G01M 19/00
[52] U.S. Cl. .......................... 73/117
[58] Field of Search .......... 73/117, 126, 123; 74/14

[56] References Cited

U.S. PATENT DOCUMENTS 4,635,472 1/1987 Scourtes ................ 73/117
4,750,354 6/1988 Krestel ................ 73/126

FOREIGN PATENT DOCUMENTS 60-253838 12/1985 Japan .
61-65133 4/1986 Japan .
932137 7/1963 United Kingdom .
1488146 10/1977 United Kingdom .

Primary Examiner—Jerry W. Myracle
Attorney, Agent, or Firm—Foley & Lardner, Schwartz, Jeffery, Schwaab, Mack, Blumenthal & Evans

[57] ABSTRACT

A less expensive and less bulky motor vehicle performance test apparatus is disclosed which conducts various tests of a motor vehicle, such as a running test of a four-wheel drive vehicle and an evaluation test of a viscous coupling of a four-wheel drive vehicle, The apparatus comprises a synchronizer including a belt drive whereby the peripheral speed of rollers of a front wheel roller assembly is equalized with the peripheral speed of rollers of a rear wheel roller assembly, eddy-current dynamometers fixedly coupled with the front and rear wheel roller assemblies, respectively. An electromagnetic clutch is arranged to interrupt the drive connection by the synchronizer. The electromagnetic clutch is engaged to conduct a running test of a vehicle under test. The clutch is disengaged and excitation current is introduced to at least one of eddy-current dynamometers to conduct an evaluation test of a viscous coupling of a four-wheel drive vehicle.

7 Claims, 2 Drawing Sheets

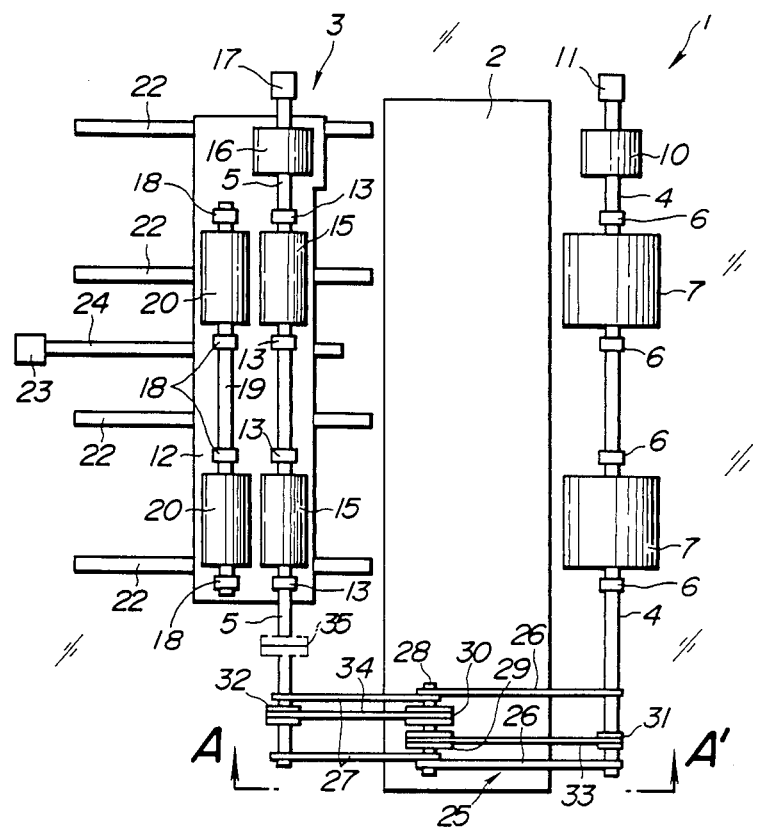
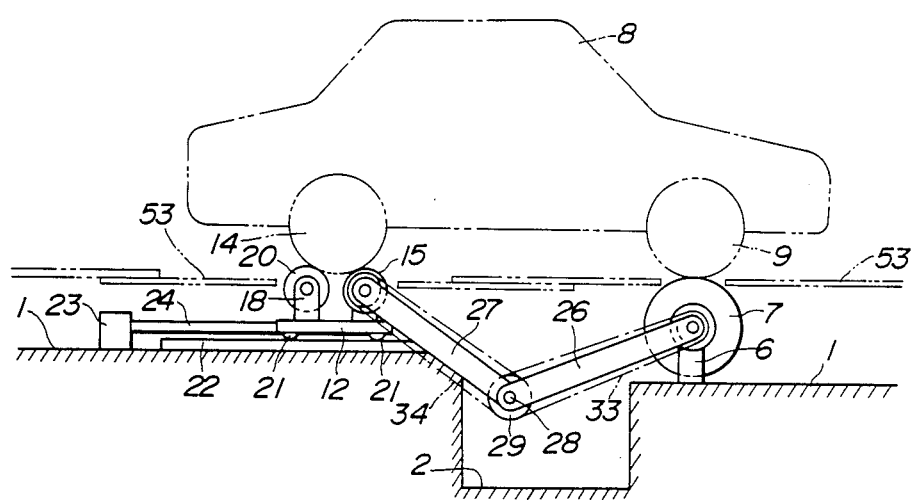

MOTOR VEHICLE PERFORMANCE TEST APPARATUS

BACKGROUND OF THE INVENTION

The present invention relates to a motor vehicle performance test apparatus, and more particularly to a motor vehicle performance test apparatus for conducting various tests of various motor vehicles including a four-wheel drive vehicle.

Among auto repair shops, it is very popular to use a chassis dynamometer when conducting running test of a motor vehicle. Most chassis dynamometers, however, are not suitable for testing a four-wheel drive vehicle, since they are so constructed as to measure driving torque of rear or front driving wheels of a two-wheel drive vehicle. Thus, there is a growing need among auto repair shop owners for an inexpensive and compact apparatus for conducting running test of a four-wheel drive vehicle.

JP No. 60-253838 A discloses a motor vehicle running test apparatus for a four-wheel drive vehicle. This known apparatus comprises a front wheel roller adapted to contact with front wheels of a four-wheel drive vehicle, a rear wheel roller adapted to contact with rear wheels thereof, and two direct-current (dc) dynamometers for controlling loads applied to the front and rear rollers, respectively. According to this known apparatus, a revolution speed of the dynamometer for the front wheel roller is detected by a revolution speed detector and fed to a vehicle speed detector where a vehicle speed is determined. The first derivative of the vehicle speed with respect to time is calculated to determine a vehicle acceleration. Based on the acceleration, a ratio of load applied to the front wheel roller to load applied to the rear wheel roller is set using an empirically determined data map. The dynamometers are so controlled as to apply loads on the front and rear wheel rollers at the ratio which has been set.

This known apparatus, however, suffers from problems that it is difficult to allow both of the front and rear wheel rollers to rotate at the same speed and expensive direct-current dynamometers are required to compensate for a difference between inertia of each roller and inertia of the vehicle under test. This has caused an increase in cost of the apparatus.

JP No. 61-65133 A discloses a motor vehicle running test apparatus designed to continuously vary a force with which each of front and rear wheel rollers contacts firmly with driving wheels by lifting the rollers. In order to allow lifting movement of the rollers, this known apparatus uses flexible joints via which the front and rear wheel rollers are connected to gear boxes, respectively. These gear boxes are connected in series via a spline shaft to a direct-current (dc) dynamometer.

In this known apparatus, there is established between the front and rear wheel rollers a power delivery system by the gear boxes and the spline shaft. The components of the power delivery system demands substantial strength to withstand power to be delivered, making the power delivery system bulky and heavy. Substantial inertia and mechanical loss have to be take into account and besides the direct-current dynamometer is used. This has caused an increase in cost of the apparatus.

An object of the present invention is to provide a less expensive and less bulky motor vehicle performance test apparatus which is constructed and arranged, without a direct-current dynamometer that is expensive and a bulky and heavy power delivery system, as to be capable of conducting various tests of a four-wheel drive vehicle.

SUMMARY OF THE INVENTION

According to the present invention, there is provided a motor vehicle performance test apparatus for conducting various tests of a motor vehicle, the vehicle having front and rear wheels, the apparatus comprising:

a front wheel roller assembly adapted to contact with the front wheels of the motor vehicle;

a rear wheel roller assembly adapted to contact with the rear wheels of the motor vehicle;

a synchronizer drivingly interconnecting the front and rear wheel roller assemblies; and dynamometers drivingly connected to the front and rear wheel roller assemblies, respectively, the synchronizer including a belt drive system, the dynamometers being in the form of an eddy-current dynamometer.

In one specific form of the present invention, in order to conduct an evaluation test of a viscous coupling installed in a four-wheel drive vehicle, the control arrangement includes excitation current control circuit means for introducing excitation currents to the dynamometers, means for delivering a rotational speed differential indicative signal indicative of a rotational speed differential between the front and rear rotor assemblies, means for delivering an abnormal signal when the rotational speed differential indicative signal is disposed outside a predetermined reference value range, and means for preventing the introduction of excitation currents to the dynamometers in response to the abnormal signal.

The control arrangement also includes means for preventing the introduction of excitation currents to the dynamometers upon elapse of a predetermined time beginning with the introduction of the excitation currents.

BRIEF DESCRIPTION OF THE DRAWINGS

FIG. 1 is a plan view of a motor vehicle performance test apparatus according to the present invention as installed on a work bed of an auto repair shop;

FIG. 2 is a section through the line A-A' of FIG. 1 showing a side elevation of the apparatus with a running board and a motor vehicle under test shown in phantom.

DETAILED DESCRIPTION OF THE INVENTION

Figure 3:
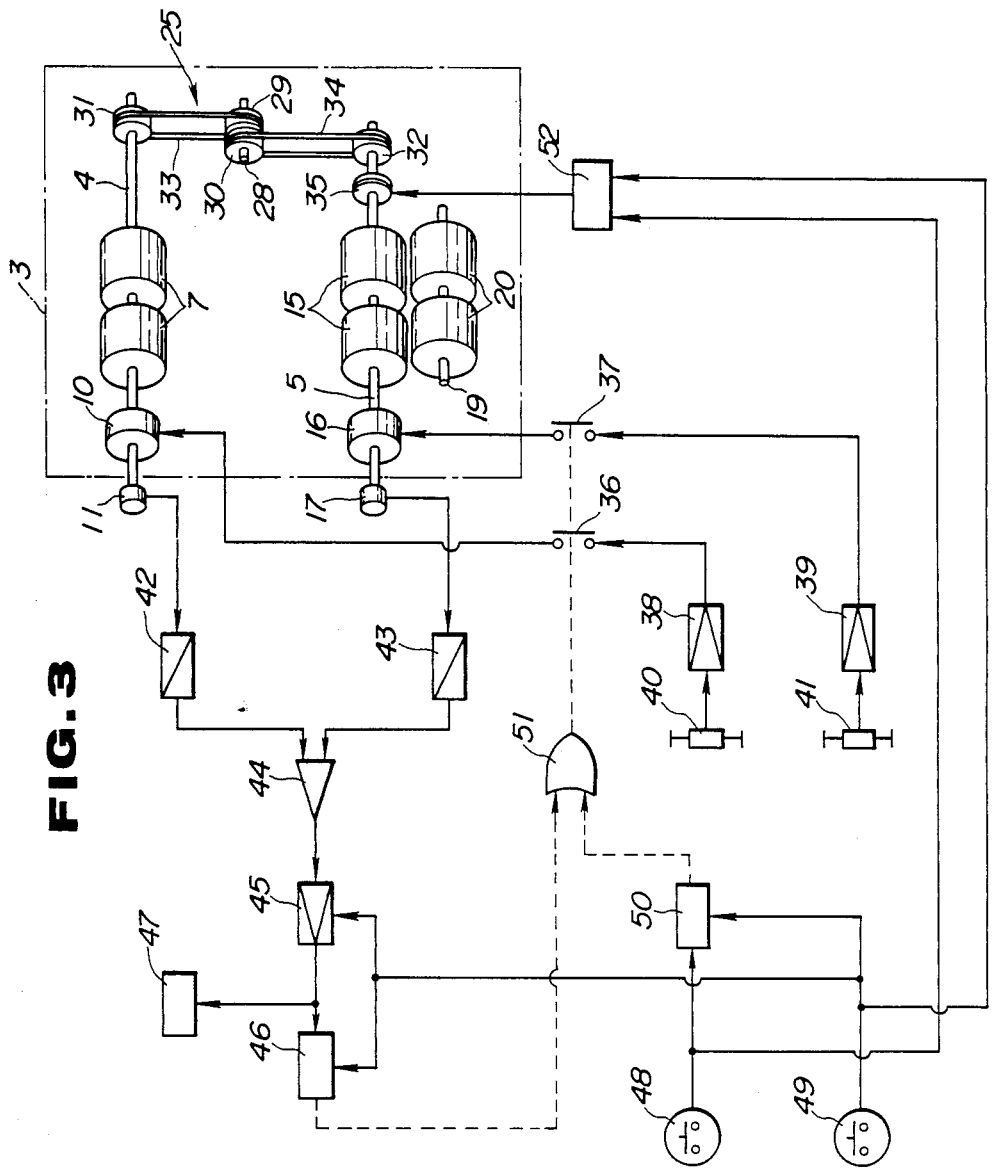
FIG. 3 is a block diagram of the motor vehicle performance test apparatus shown in FIG. 1 with an associated control arrangement.

Referring to the accompanying drawings, and more particularly to FIGS. 1 and 2 thereof, reference numerals 1 indicate a work bed provided in an auto-repair shop. As best seen in FIG. 2, the work bed 1 is formed with a well 2 (which is often called as a pit) formed between stepped flat surfaces. A motor vehicle performance test apparatus 3 according to the present invention is installed around this well 2. The apparatus 3 comprises a front wheel roller assembly including a roller shaft 4 and a rear wheel roller assembly including a roller shaft 5. The roller shaft 4 of the front wheel roller assembly is rotatably supported by a plurality of brackets 6 fixedly secured to one of the stepped surfaces which has a relatively low height. The roller shaft 4 has a pair of front wheel rollers 7 adapted to contact with a pair of front wheels 9 of a motor vehicle 8 under test. The roller shaft 4 has one end fixedly coupled with a rotor of a dynamometer in the form of an eddy-current dynamometer 10.

The roller shaft 5 of the rear wheel roller assembly is rotatably supported by a plurality of brackets 13 fixedly secured to a frame 12. The roller shaft 5 has a pair of rear wheel rollers 15 adapted to contact with a pair of rear wheels 14 of the motor vehicle in cooperation with a pair of auxiliary rollers which are described later. The roller shaft 5 has one end fixedly coupled with a rotor of a dynamometer in the form of an eddy-current dynamometer 16.

Securely fixed also to the frame 12 are a plurality of brackets 18 which rotatably support an auxiliary shaft 19 with a pair of auxiliary rollers 20. The auxiliary rollers 20 are disposed adjacent the rollers 15, respectively, so that the rear wheels 14 of the vehicle 8 are kept in rolling contact with the rollers 15 and 20. As best seen in FIG. 2, the rollers 15 have a diameter smaller than a diameter of the rollers 7.

In order to allow the rear wheel roller assembly to move relative to the front wheel roller assembly in such a manner as to vary distance therebetween, the frame 12 has wheels 21 rotatable along a plurality of parallel guide rails 22 securely fixed to the other of the stepped surfaces which has a relatively high height. The frame 12 is moved by an actuator including a motor 23 via an appropriate mechanism which converts a turning movement of an output shaft, not shown, of the motor 23 to a linear movement of the frame 12 along the guide rails 22. In this embodiment, the mechanism includes a threaded rotary rod 24 having one end fixedly coupled to the output shaft of the motor 23. The opposite end portion of the rotary rod 24 is threadedly engaged with a tapped guide portion, not shown, of the frame 12.

In order to equalize the peripheral speed of the rollers 15 with the peripheral speed of the rollers 7, the opposite end portions of the roller shafts 4 and 5 are operatively interconnected by a synchronizer 25 using a belt drive system. The synchronizer 25 includes a pair of first parallel link plates 26 and a pair of second parallel link plates 27. The first parallel link plates 26 have one ends rotatably receiving the opposite end portion of the roller shaft 4 and opposite ends rotatably receiving a floating shaft 28. The second parallel link plates 27 have one ends rotatably receiving the floating shaft 28 and opposite ends rotatably receiving the opposite end portion of the rotor shaft 5. The flowting shaft 28 has a pair of pulleys 29 and 30 fixedly coupled therewith. These pulleys 29 and 30 have the same diameter. The synchronizer 25 includes two different diameter pulleys, namely a pulley 31 with a relatively small diameter and a pulley 32 with a relatively large diameter. The pulley 31 is fixedly coupled with the rotor shaft 4 at a portion between the pair of first link plates 26, while the pulley 32 is fixedly coupled with the rotor shaft 5 at a portion between the pair of second link plates 27. A power transmission belt 33 interconnects the pulleys 31 and 29, while a power transmission belt 34 interconnects the pulleys 30 and 32. In this embodiment, the diameters of the pulleys 31 and 32 are set such that when for example the front wheels 9 drives the rollers 7, the peripheral speed of the rollers 15 will become equal to the peripheral speed of the rollers 7. Preferably, the power transmission belts 33 and 34 are so-called V belts. Alternatively, such transmission belts may be made of timing belts, respectively. The pulleys 31, 29, 30 and 32 used in this embodiment are pulleys for V belts, but they may be made of timing pulleys, if timing belts are used.

In order to detect the rotational speed of the rotor shaft 4, a rotational speed sensor 11 is provided which generates a train of pulses with a frequency variable with the rotational speed of the rotor shaft 4. A similar sensor 17 is provided to detect the rotational speed of the rotor shaft 5. The pulse signals of these instruments are fed to signal converters 42 and 43 as shown in FIG. 3. In FIG. 1, the drive connection is always established between the rotor shafts 4 and 5 via the synchronizer 25, but it may be interrupted by a clutch as illustrated in broken line at 35, if desired. As is made clear as discussion proceeds referring to FIG. 3, the clutch 35 is disengaged to interrupt the drive connection between the rotor shafts 4 and 5. In FIG. 2, reference numerals 53 indicate a running board which a motor vehicle under test is placed on.

In order to make the apparatus according to the present invention more fully understood, the procedure of conducting a running test of a motor vehicle is explained.

Firstly, the distance between the front wheel roller assembly and the rear wheel roller assembly is adjusted to a distance between the front wheel axle and the rear wheel axle of a motor vehicle to be tested by moving the frame 12 of the rear wheel roller assembly toward or away the front wheel roller assembly. The displacement of the frame 12 of the rear wheel roller assembly is effected by turning the rotary rod 24 by the motor 23. During this movement of the frame 12 of the rear wheel roller assembly, an angle which the first link plates 26 form with the second link plates 27 at the floating shaft 28 varies even though the power transmission function by the synchronizer 25 remains unchanged. The frame 12 is locked after it has been moved to an appropriate position.

Then, a driver gets in the motor vehicle and drives same onto the running board 53 until the front wheels is placed on the front wheel rollers 7 and the rear wheels placed on the rear wheel rollers 15 and the auxiliary rollers 20. The preparation for running test is now completed.

Then, the running test is initiated by driving the vehicle on the rollers 7, 15 and 20. Assuming now that the vehicle under test is a front drive vehicle, the front wheel rollers 7 are driven to rotate by the front driving wheels. The rotation of the front wheel rollers 7 is transmitted to the rotor shaft 4. The rotation of the rotor shaft 4 is transmitted to the rotor shaft 5 by means of the synchronizer 25. Since the rotor of the eddy-current dynamometer 10 is fixed to the rotor shaft 4 for unitary rotation therewith and rotates within a magnetic field inside a stator of the dynamometer 10, an eddy current is induced and flows through the stator. The power transmitted to the rotor of the dynamometer 10 is absorbed in terms of heat caused by the eddy current induced. The driving torque of the vehicle under test is thus found by measuring the stator torque of the dynamometer 10.

In this embodiment, the setting is made such that the peripheral speed of the rotors 15 is equal to the peripheral speed of the rotors 7 so that running condition where the vehicle runs on a flat road is given. Thus, the ordinary running and acceleration test on the flat road can be conducted.

During conducting the running test, only a small portion of the power is transmitted from the roller shaft 4 to the roller shaft 5 by means of synchronizer 25 and then absorbed by the other dynamometer 16. However, the amount of the power transmitted is not all of the power. Thus, the synchronizer 25 needs not to posess a strength high enough to withstand the power transmission of all of the power.

If a motor vehicle under test is a rear drive vehicle, the rotor shaft 5 is driven by the rear driving wheels of the vehicle. The rotation of the rotor shaft 5 is transmitted to the rotor shaft 4 by means of the synchronizer 25. Since the rotor of the eddy-current dynamometer 16 is fixed to the rotor shaft 5 and rotates within a magnetic field inside a stator of the dynamometer 16, an eddy current is induced and flows through the stator. The driving torque of the vehicle under test is thus found by measuring the stator torque of the dynamometer 16.

If a motor vehicle under test is a four-wheel drive vehicle, torques produced by the front wheels and rear wheels of the vehicle are found by measuring the stator torques of the dynamometers 10 and 16, respectively.

Hereinafter, the procedure of conducting an evaluation test of a viscous coupling used in a four wheel drive of a motor vehicle is explained.

Referring to FIG. 3, the outputs of the sensors 11 and 17 are converted at converters 42 and 43 into voltage signals with magnitudes indicative of rotational speeds of the rotor shafts 4 and 5, respectively. The voltage signals are supplied to input terminals of an operational amplifier 44 which provides an output indicative of a difference between the inputs. Thus, the output of the operational amplifier 44 indicates a difference between the rotational speeds of the rotor shafts 4 and 5. The output of the operational amplifier 44 is stored in a memory 45. The content of the memory 45 is indicated by a display 47 for example a meter. The content of the memory 45 is reset when a reset switch 49 is closed.

The output indicative of the content of the memory 45 is supplied also to a discrimination unit 46 which delivers an abnormal state indicative signal in the form of a logical one signal only when the magnitude of the input signal exceeds a predetermined rotational speed differential reference value range. This discrimination unit 46 includes a microcomputer with a ROM which stores various reference value ranges that differ in different kinds and types of vehicles. These reference value ranges are arranged in the ROM such that the proper reference value range is retrieved when a kind and a type of a vehicle under test are entered via a suitable entry device. Based on this reference value range, the input from the memory 45 is judged. When the input is disposed outside the reference value range, the discriminator unit 46 delivers a logical one signal to a logical OR gate 51. The other input terminal of the logical OR gate 51 is connected to a timer 50.

The timer 50 is activated when a start switch 48 is closed and reset when a reset switch 49 is closed. The timer delivers a time over signal in the form of a logical one signal to the other input terminal of the logical OR gate 51 upon elapse of a predetermined time after closing of the start switch 48. The length of this predetermined time is adjustable so that an allowable time can be set depending on a kind and type of a viscous coupling mounted in the vehicle under test.

The electromagnetic clutch 35 is controlled by a clutch control unit 52 such that the clutch 35 is engaged when the start switch 48 is closed and disengaged when the reset switch 49 is closed. Thus, disengagement of the electromagnetic clutch 35 interrupts the drive connection between the rotor shafts 4 and 5.

The excitation current is introduced to the stator of the dynamometer 10 by an excitation current control circuit 38 via a normally closed relay switch 36, while the excitation current is introduced to the stator of the dynamometer 16 by an excitation current control circuit 39 via a normally closed relay switch 37. The output of the rotor shaft 4 is absorbed by the dynamometer 10, while the output of the rotor shaft 5 is absorbed by the dynamometer 16. The magnitude of absorption by each of the dynamometers 10 and 16 is regulated by regulating the magnitude of current introduced to the stator of each dynamometer. The magnitude of current introduced to the dynamometer 10 is adjustable by an excitation current setter 40, while the magnitude of current introduced to the dynamometer 16 is adjustable by an excitation current setter 41. Thus, the absorptions of output by the dynamometers 10 and 16 are adjustable by the excitation current setters 40 and 41, respectively.

The normally closed relay switches 36 and 37 are associated with the logical OR gate 51 such that they are opened in response to the logical one output signal of the logical OR gate 51.

In order to conduct an evaluation test of a viscous coupling of a vehicle under test, the start switch 48 is closed to disengage the electromagnetic clutch 35 and to activate the timer 50 while the vehicle under test is being driven on the rollers 7, 15 and 20. It is preferred that before conducting the evaluation test of the viscous coupling, the front and rear wheels of the vehicle on the rollers 7, 15 and 20 rotate at the same speed. This condition can be easily accomplished by the synchronizer 25 shown in FIG. 1. Closing the start switch 48 causes energization of the relay switches 36 and 37 so that the relay switches 36 and 37 are closed. The relay switches 36 and 37 are simultaneously closed and opened in response to closing and opening of the start switch 48.

When the clutch 35 is disengaged, the drive connection between the rotor shafts 4 and 5 via the synchronizer 25 is interrupted so that the front wheel roller assembly 4, 7 and rear wheel roller assembly 15, 5, 19, 20 follow rotations of the front and rear wheels of the vehicle under test. When the relay switches 36 and 37 are closed, the excitation currents set by the excitation current setters 40 and 41 are introduced to the stators of the dynamometers 10 and 16.

The excitation current may be introduced to one of the dynamometers 10 and 16 to apply load on the corresponding one of the front wheel and rear wheel roller assemblies. If desired, the excitation currents may be introduced to both of the dynamometers 10 and 16 to apply loads on the front and rear wheel roller assemblies, respectively.

If at least one of front and rear wheel assemblies is subject to load, the wheels contacting with the loaded wheel roller assembly are subject to deceleration. There occurs a rotational speed differential between the front and rear wheels of the vehicle. The viscous coupling allows this rotational speed differential between the front and rear wheels of the vehicle under test.

When the viscous coupling is subject to the rotational speed differential, silicone oil disposed between inner and outer plates of the coupling is subject to a shear stress to produce a so-called viscous torque. As a result, a portion of torque produced by the driving wheels of the vehicle is split via the viscous coupling to the other wheels thereof.

Thus, the rotational speed of the driving wheels decreases, while the rotational speed of the wheels which receive the split torque via the viscous coupling increases. This results in reducing the rotational speed differential between the front and rear wheels and the rotational speed differential tends to fall in a predetermined rotational speed differential value range.

However, if the viscous coupling is abnormal, i.e., the silicone oil filled in the viscous coupling is below a designed amount or the silicone oil becomes too dirty or the inner and outer plates are worn out for example, the viscous torque becomes smaller than a normal value so that the rotational speed differential between the front and rear wheels does not reduce so much.

With due consideration of the above mentioned characteristic of the viscous coupling, the before mentioned rotational speed differential reference value ranges are determined based on experimental data and set in the discriminator unit 46. Thus, comparing the actual rotational speed differential represented by the output of the memory 45 and the rotational speed differential reference value range is effective in judging the performance of the viscous coupling installed in the vehicle under test. Since the rotational speed differential between the front and rear wheels tends to decrease toward some value in any case, the duration of detecting time should be set with due consideration of the duration of time within which the rotational speed differential decreases to the some value so that the result of judgement becomes good and reliable.

The discriminator unit 46 delivers a logical one signal to the logical OR gate 51 only when the input falls outside the rotational speed differential reference value range.

Upon receiving the logical one signal from the discriminator unit 46, the logical OR gate 51 delivers an output signal which causes deenergizatuion of a relay, not shown, that causes the relay switches 36 and 37 to open. When the relay switches 36 and 37 are opened, the introduction of excitation current to the dynamometer ceases, deactivating the dynamometer so that output absorption function by the dynamometer stops.

Therefore, when the viscous coupling is abnormal, the evaluation test ends immediately so that the inspection and service of the abnormal viscous coupling can be conducted.

When the viscous coupling is normal and the rotational speed differential stays within the reference value range, the time over signal is delivered by the timer 50 upon elapse of the predetermined time even though there is no delivery of the logical one signal by the discriminator unit 46. Thus, the logical OR gate 51 causes the relay switches 36 and 37 to open to stop introduction of excitation current to the dynamometer upon elapse of the predetermined time.

Therefore, if the viscous coupling is normal, the rollers 7 and 15 are relieved from load to allow the front and rear wheels of the vehicle to rotate at substantially the same speed upon elapse of a predetermined time set in the timer 50, so that the rotational speed differential which the inner and outer plates of the viscous coupling are subject to is removed. Thus, the shear stress which the silicone oil is subject to during the test is removed upon elapse of the predetermined time after beginning of the test. This is advantageous in that the production of excessive heat within the viscous coupling by the shear stress which the silicone oil is subject to is prevented. As a result, the damage on the viscous coupling due to the test is prevented.

The test is completed by turning ON or closing the reset switch 49, allowing the clutch 35, memory 45, discriminator unit 46 and timer 50 to restore their original states or positions.

What is claimed is:

1. A motor vehicle performance test apparatus for conducting various tests of a motor vehicle, the vehicle having front and rear wheels, the apparatus comprising:
   a front wheel roller assembly adapted to contact with the front wheels of the motor vehicle;
   a rear wheel roller assembly adapted to contact with the rear wheels of the motor vehicle;
   a synchronizer drivingly interconnecting said front and rear wheel roller assemblies; and
   dynamometers drivingly connected to said front and rear wheel roller assemblies, respectively,
   said synchronizer including a belt drive system,
   said dynamometers being in the form of an eddy-current dynamometer.

2. A motor vehicle performance test apparatus as claimed in claim 1, wherein said synchronizer includes a first pair of link plates having one ends rotatably connected to said first roller assembly and opposite ends rotatably receiving a floating shaft, a second pair of link plates having one ends rotatably receiving said floating shaft and opposite ends rotatably connected to said second roller assembly, a first pulley rotatable with said first roller assembly, a second pulley rotatable with said floating shaft, a third pulley rotatable with said floating shaft, a fourth pulley rotatable with said second roller assembly, a first power transmission belt interconnecting said first and second pulleys, and a second power transmission belt interconnecting said third and fourth pulleys.

3. A motor vehicle performance test apparatus as claimed in claim 1, including a clutch constructed and arranged as to interrupt drive connection between said first and second roller assemblies.

4. A motor vehicle performance test apparatus as claimed in claim 1, including a mechanism constructed and arranged as to move one of said first and second roller assemblies relative to the other in such a manner as to vary distance therebetween.

5. A motor vehicle performance test apparatus as claimed in claim 1, including a control arrangement.

6. A motor vehicle performance test apparatus as claimed in claim 5, wherein said control arrangement includes excitation current control circuit means for introducing excitation currents to said dynamometers, means for delivering a rotational speed differential indicative signal indicative of a rotational speed differential between said front and rear rotor assemblies, means for delivering an abnormal signal when said rotational speed differential indicative signal is disposed outside a predetermined reference value range, and means for preventing the introduction of excitation currents to said dynamometers in response to said abnormal signal.

7. A motor vehicle performance test apparatus as claimed in claim 6, wherein said control arrangement includes means for preventing the introduction of excitation currents to said dynamometers upon elapse of a predetermined time beginning with the introduction of the excitation currents.

* * * * *